United States Patent
Lewis

(10) Patent No.: US 11,048,393 B2
(45) Date of Patent: Jun. 29, 2021

(54) PERSONALIZED VISUAL REPRESENTATIONS OF AN ARTIFICIALLY INTELLIGENT AGENT

(71) Applicant: Toyota Research Institute, Inc., Los Altos, CA (US)

(72) Inventor: Thor Lewis, Los Altos, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 108 days.

(21) Appl. No.: 15/916,679

(22) Filed: Mar. 9, 2018

(65) Prior Publication Data

US 2019/0278464 A1 Sep. 12, 2019

(51) Int. Cl.
G10L 15/22 (2006.01)
G10L 21/10 (2013.01)
G06F 3/0484 (2013.01)
G06F 40/35 (2020.01)

(52) U.S. Cl.
CPC .......... *G06F 3/04845* (2013.01); *G06F 40/35* (2020.01); *G10L 15/22* (2013.01); *G10L 21/10* (2013.01); *G10L 2015/223* (2013.01); *G10L 2015/225* (2013.01)

(58) Field of Classification Search
CPC .... G06F 3/04845; G06F 40/35; G06F 40/103; G10L 15/22; G10L 21/10; G10L 2015/223; G10L 2015/225
See application file for complete search history.

(56) References Cited

U.S. PATENT DOCUMENTS

| 7,568,165 | B2* | 7/2009 | Amadio | G06F 9/451 715/779 |
| 8,135,392 | B2* | 3/2012 | Marcellino | H04L 51/24 455/418 |
| 8,239,206 | B1* | 8/2012 | LeBeau | H04M 1/271 704/275 |
| 8,321,801 | B2* | 11/2012 | Chaudhri | G06F 3/0481 715/765 |
| 8,402,378 | B2 | 3/2013 | Blattner et al. | |
| 8,775,957 | B2* | 7/2014 | Kim | G06F 1/1626 715/765 |
| 8,887,080 | B2* | 11/2014 | Hayman | G06F 3/0481 715/772 |
| 8,893,033 | B2* | 11/2014 | Donahue | G06F 3/04817 715/772 |

(Continued)

OTHER PUBLICATIONS

Shape Definition of Shape by Lexico, accessed Mar. 5, 2020, 1 page (Year: 2020).*

(Continued)

*Primary Examiner* — Yongjia Pan
(74) *Attorney, Agent, or Firm* — Christopher G. Darrow; Darrow Mustafa PC

(57) ABSTRACT

Systems and methods for displaying a personalized visual representation of an artificially intelligent (AI) agent. The system presents a first representation of the AI agent on a display. A user provides an input to the AI agent through an input device. The system determines a type of information included in the input. The system then modifies feature(s) of the first representation to form a different representation of the AI agent based on the type of information included in the input. The second representation is then presented on the display.

16 Claims, 4 Drawing Sheets

(56) References Cited

U.S. PATENT DOCUMENTS

| | | | | |
|---|---|---|---|---|
| 8,924,869 | B2* | 12/2014 | Fellman | G06F 3/0481 715/762 |
| 9,032,317 | B2* | 5/2015 | Santoro | G06F 3/0481 715/765 |
| 10,001,902 | B2* | 6/2018 | Gomez-Rosado | G06F 3/0482 |
| 10,042,535 | B2* | 8/2018 | Han | G06F 3/04883 |
| 2007/0101291 | A1* | 5/2007 | Forstall | G06F 3/0481 715/805 |
| 2007/0130541 | A1* | 6/2007 | Louch | G06F 9/451 715/804 |
| 2008/0104018 | A1* | 5/2008 | Xia | G06F 9/451 |
| 2008/0235602 | A1* | 9/2008 | Strauss | G06F 9/451 715/762 |
| 2011/0025689 | A1 | 2/2011 | Perez et al. | |
| 2011/0191316 | A1* | 8/2011 | Lai | G06F 7/10 707/706 |
| 2011/0320980 | A1* | 12/2011 | Hand | H04M 1/72583 715/828 |
| 2015/0058744 | A1* | 2/2015 | Dhingra | G06F 9/451 715/747 |
| 2015/0095820 | A1* | 4/2015 | Fellman | G06F 3/0481 715/765 |
| 2015/0230022 | A1* | 8/2015 | Sakai | H04R 1/1041 381/58 |
| 2015/0277938 | A1* | 10/2015 | Lu | G06F 9/451 717/168 |
| 2016/0021105 | A1* | 1/2016 | Pellom | G06F 16/3331 726/7 |
| 2017/0177600 | A1* | 6/2017 | Zhang | G06F 16/90324 |
| 2017/0344895 | A1* | 11/2017 | Roy | G06F 3/0484 |
| 2018/0174229 | A1* | 6/2018 | Sherwin | G06F 8/34 |
| 2018/0286401 | A1* | 10/2018 | Oh | G10L 15/063 |
| 2018/0336284 | A1* | 11/2018 | Agnoli | G04G 21/00 |
| 2019/0034067 | A1* | 1/2019 | Latzina | G06F 9/44505 |
| 2019/0079665 | A1* | 3/2019 | Xian | G06F 3/04883 |

OTHER PUBLICATIONS

Richard Devine, Hands on with the Nokia Z Launcher, Jun. 19, 2014, 5 pages (Year: 2014).*

Chunhui Zhang, Xiang Ding, Guanling Chen, Ke Huang, Nihao: A Predictive Smartphone Application Launcher, Jan. 2013, 1 page (Year: 2013).*

[KWGT][Kustom Widget] At A Glance for KWGT, Oct. 25, 2017, 5 pages (Year: 2017).*

Rita El Khoury, PSA: At A Glance widget on Pixel 2 added flight information, Jan. 9, 2018, 1 page (Year: 2018).*

Adam Conway, "Another Widget" Brings the Google Pixel 2's Calendar Widget to Any Phone, Oct. 12, 2017, 4 pages (Year: 2017).*

Jeannie Hill, What is Google Now and How to Use Google Now Cards, Aug. 10, 2016, 10 pages (Year: 2016).*

* cited by examiner

PERSONALIZED VISUAL REPRESENTATIONS OF AN ARTIFICIALLY INTELLIGENT AGENT

TECHNICAL FIELD

The present disclosure relates generally to artificially intelligent agents and, more specifically, to visual representations of artificially intelligent agents.

BACKGROUND

Artificial intelligence is a fairly recent commercial development. While typically a feature known only in TV, artificial intelligence is only recently gaining market acceptance and popularity through development of various artificially intelligent agents. For example, many mobile devices run on their own platforms, and many of these platforms/devices include a respective artificially intelligent (AI) agent. These AI agents are able to respond to user inputs by processing speech inputs and forming a response using information from, for instance, the internet. However, these AI agents are typically not visually represented. Further, where the AI agent is visually represented, the representation is typically stagnant (e.g., it is a fixed representation set by developers of the platform).

SUMMARY

The present disclosure describes displaying personalized visual representations of an artificially intelligent agent according to inputs provided by a user.

In one example, a system for displaying a personalized visual representation of an artificially intelligent agent is described. The system can include an input device for receiving inputs from a user to interact with an artificially intelligent (AI) agent. The system can include a communications device for communicating information related to the inputs to a remote source. The remote source can provide response information corresponding to the inputs received from the user. The system can include a display for presenting, at least, visual representations of the AI agent to the user. The system can include a processor operatively connected to the input device, the communications device, and the display. The system can include memory operatively connected to the processor. The memory can store executable instructions that, when executed by the processor, cause the processor to present a first representation of the AI agent on the display. The memory can store instructions to receive an input unrelated to the first representation of the AI agent from a user via the input device. The memory can store instructions to determine a type of information included in the input. The memory can store instructions to modify one or more features of the first representation to form a second representation of the AI agent based on the type of information included in the input. The memory can store instructions to present the second representation of the AI agent on the display.

In another example, a method of displaying a personalized visual representation of an artificially intelligent agent is described. The method can include presenting a first representation of an artificially intelligent (AI) agent on a display on a first device. The method can also include receiving an input from a user that is unrelated to the first representation of the AI agent using one or more input devices for interacting with the AI agent. The method can also include determining a type of information included in the input. The method can also include modifying one or more features of the first representation to form a second representation of the AI agent based on the type of information included in the input. The method can include presenting the second representation of the AI agent on the display of the first device.

DETAILED DESCRIPTION

Systems and methods for displaying a personalized visual representation of an artificially intelligent (AI) agent are described. The system presents a representation of the AI agent on a display. A user provides an input to the AI agent through an input device. The system determines a type of information included in the input. The system then modifies feature(s) of the first representation to form a different representation of the AI agent based on the type of information included in the input. The second representation is then presented on the display. As such, the representation of the AI agent is personalized to the user based on various inputs provided by the user to the AI agent.

The arrangements described herein provide many benefits. For instance, the arrangements described herein can provide automatic personalization of an agent based on inputs provided by a user. Additionally, the arrangements described herein can provide a cross-platform representation of an AI agent. The arrangements described herein can provide a more entertaining way of interacting with an AI agent. Many other additional benefits will become apparent in the following description follows.

Figure 1A:
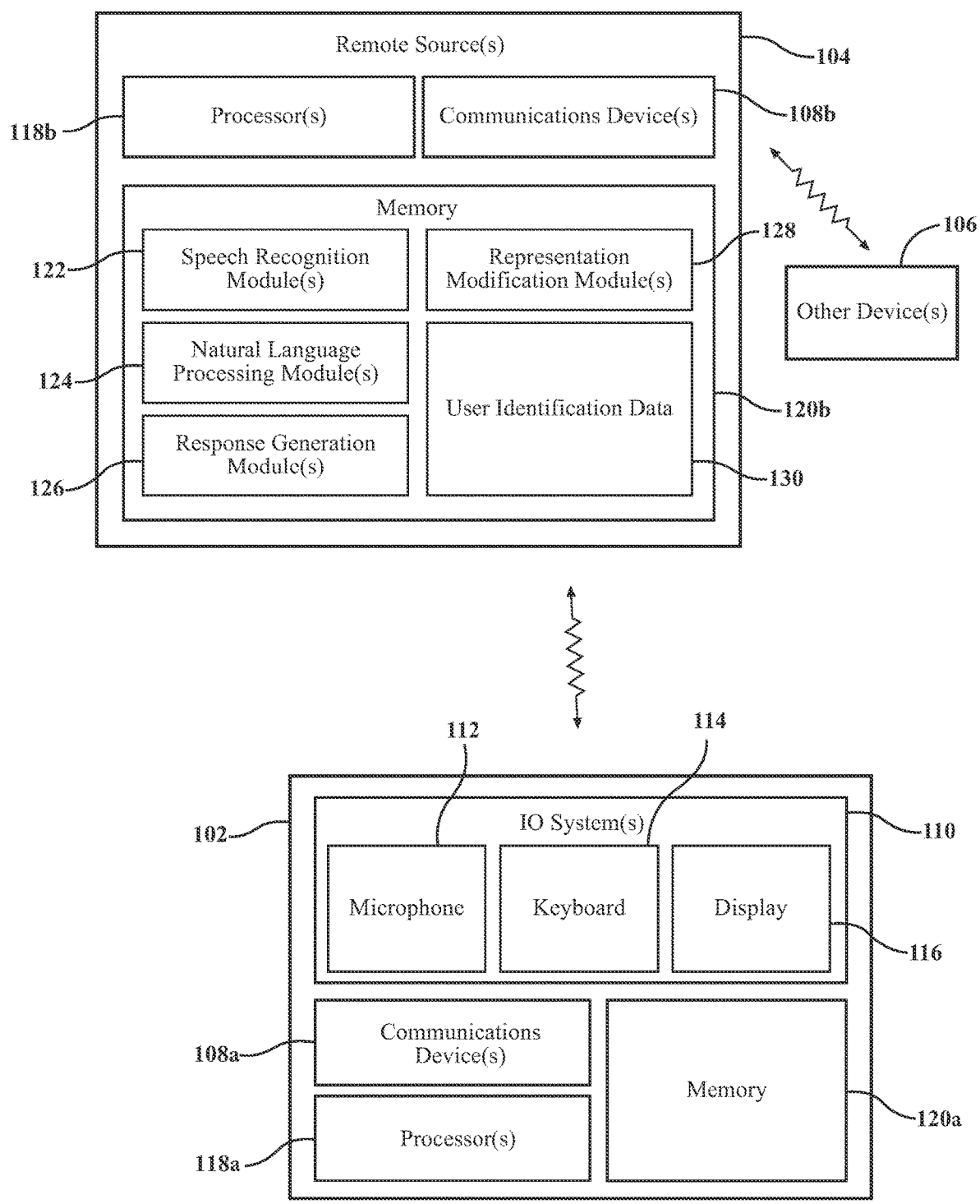
FIG. 1 is a system for displaying a personalized visual representation of an artificially intelligent (AI) agent.

Referring now to FIG. 1, a system 100 is shown. The system 100 can include a first user device 102 and one or more remote source(s) 102. In one or more implementations, the first user device 102 may be a user device implemented in an automobile. For example, the first user device 102 may be a head unit. In other implementations, the first user device 102 may be a mobile device (e.g., a smart phone, tablet, etc.), a laptop or personal computer, etc. The first user device 102 can be associated with a user (e.g., by way of the user owning or operating the first user device 102, for example). As will be discussed in greater detail below, various aspects of the first user device 102 can be personalized to the user based on inputs provided by the user.

The remote source(s) 104 can be a remote server or computer wirelessly connected to the first user device 102. The remote source(s) 104 can be configured to manage and/or store one or more types of data. For instance, the remote source(s) 104 can be configured to transmit and receive data to and from remote locations, such as the first user device 102 and/or other remote locations. While one remote source(s) 104 is shown, in some instances, the system 100 may include multiple remote sources 104. In instances such as these, each of the remote sources 104 can be configured to manage specific types of data and tasks. Additionally, each of the multiple remote sources 104 can be configured to communicate with one another.

The system 100 can also include one or more other devices 106. The other device(s) 106 can also be associated with the user. Similar to the first user device 102, the other device(s) 106 may be implemented as a head unit in an automobile, may be a mobile device (e.g., a smart phone, a tablet, etc.), a laptop or personal computer, etc.

The remote source(s) 104 can be configured to communicate with the other device(s) 106 and the first user device 102. The remote source(s) 104 can include a communications device 108b. The communications device 108b is or includes any device, component, or group of devices/components configured to communicate wirelessly with another location. For instance, the communications device 108b can include an antenna tuned to transmit and/or receive data to and/or from another antenna at a frequency. The remote source(s) 104 can transmit data and receive data to one or more remote locations (such as the first user device 102, other device(s) 106, etc.) that are not physically connected to the remote source(s) 104 using the communications devices 108b.

The communications device 108b at the remote source(s) 104 can be configured to communicate with the first user device 102 and/or the other device(s) 106. For instance, the first user device 102 can include a communication device 108a. Additionally, though not shown in FIG. 1, the other device(s) 106 can include respective communications device(s). The communication device 108a of the first user device 102 can include an antenna tuned to exchange data with the antenna of the communications device 108 of the remote source(s) 104. Similarly, the communications device of the other device(s) 106 can include respective antennas tuned to exchange data with the antenna of the communications device 108 of the remote source(s) 104. In some instances, the communication device 108a for the first user device 102 can be configured to exchange data with the communications device for the other device(s) 106. The communications devices 108, 110 can communicate via one or more communications networks including, for instance, a cellular network, Bluetooth, WI-FI, to name a few possibilities. In some arrangements, the first user device 102 can transmit data to and/or receive data from the remote source(s) 104. In this regard, the first user device 102, the remote source(s) 104, and the other device(s) 106 can be configured to exchange data with one another according to various arrangements.

The first user device 102 can include an input/output (I/O) system 110. An "input system" includes any device, component, system, element or arrangement or groups thereof that enables information/data to be entered into a machine. The input system(s) can receive an input from a user. The input system(s) can include one or more components usable by the user to provide such inputs. For instance, the input system(s) can include a keyboard 114 for providing textual inputs to the first user device 102. The keyboard 114 can include physical keys, can be provided on a touch-sensitive display, etc. Additionally, the input system(s) can include a microphone 112. The microphone 112 can generate audio signals based on utterances from the user. While these two examples are provided, the input system(s) can include many other components for the user to provide inputs to the first user device 102.

An "output system" includes any device, component, or arrangement or groups thereof that enable information/data to be presented to a user. The output system(s) can include one or more components usable to provide such outputs to the user. For instance, the output system(s) can include a display 116. The display 116 can be a liquid crystal display (LCD), a light emitting diode (LED) display, an organic LED display, a plasma display, a cathode ray tube display, to name a few possibilities. The I/O system(s) 110 are usable to exchange data, inputs, outputs, information, etc. between the user and various components of the system 100.

In some arrangements, the system 100 can include two or more I/O systems 110. For example, the system 100 can include a first I/O system 110 incorporated within the first user device 102, and the system 100 can include additional I/O system(s) (not shown) incorporated within the other device(s) 106.

In some examples, the user may provide one or more inputs to the I/O system(s) 110. Such inputs may be textual inputs, voice inputs (e.g., voice prompts or natural language utterances, etc.) or some other input. Such inputs may be provided to an interface, referred to herein as an artificially intelligent (AI) agent. AI agent, as used herein, refers to an interface to various components/elements of a system intended to form human-like responses to inputs provided thereto from a user. In this regard, the AI agent emulates human interactions with the user. As will be discussed in greater detail below, the AI agent can include components to translate voice inputs from the user into text (or receive text inputs from the user). The AI agent can include components to interpret the text to extract a meaning of the user's inputs. The AI agent can include components to generate a response to the user's inputs. The AI agent can be visually represented to the user via the display 116 of the I/O system(s) 110. The representation of the AI agent can be modified according to the user's inputs. In this regard, the user can have a personalized visual representation of the user's AI agent, as will be discussed in greater detail below.

The system 100 includes one or more processors. The processor(s) are configured to implement or perform various functions described herein. One or more processor(s) 118a can be included in the first user device 102. Additionally, one or more processor(s) 118b can be included at the remote source(s) 104. In one or more arrangements, the processor(s) 118a, 118b can be a main processor of the first user device 102/remote source(s) 104. For instance, the processor(s) 118a, 118b can each be an electronic control unit (ECU). While shown as being implemented within the first user device 102 and remote source(s) 104, in some instances the processor(s) can located remotely and accessible via the respective communication devices 108a, 108b. Additionally, though not shown, each of the other device(s) 106 can include respective processors.

The remote source(s) 104 can include memory 120b for storing one or more types of data. The memory 120b can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 120b can be a component of the processor(s) 118a, 118*b*, or the memory 120*b* can be operatively connected to the processor(s) 118*a*, 118*b* for use thereby.

In some instances, such as that shown in FIG. 1, the memory 120*b* can be located wholly at the remote source(s) 104. In other instances, memory 120*b* can be included at the remote source(s) 104 and/or the first user device 102. Additionally, though not shown, the other device(s) 106 can also include memory 120*b*.

In one or more arrangements, the memory 120*b* can include various instructions stored thereon. In one or more arrangements, the memory 120*b* can store one or more modules. Modules can be or include computer-readable instructions that, when executed by the processor(s) 118*a*, 118*b*, cause the processor(s) 118*a*, 118*b* to perform the various functions disclosed herein. While the modules will be described herein with reference to functions for purposes of brevity, it should be understood that the modules include instructions that cause the processor(s) 118*a*, 118*b* to perform the described functions. Furthermore, although some modules are shown as being provided on the memory 120*b* for the remote source(s) 104, those modules can be stored in memory 120*a* for the first user device 102, for instance. In these arrangements, the processor(s) 118*a* of the first user device 102 can execute the functions of the modules. Additionally or alternatively, the processor(s) 118*a* of the first user device 102 can access the remote source(s) 104 to receive the instructions from the modules, and the processor(s) 118*a* of the first user device 102 can execute those instructions.

The memory 120*b* can store one or more speech recognition modules 122. The speech recognition module(s) 122 can include instructions that, when executed by the processor(s) 118*a*, 118*b*, cause the processor(s) 118*a*, 118*b* to generate a computer-understandable representation of a speech utterance from a user. In some examples, the speech utterance can be received by the I/O system(s) 110 of the first user device 102. The first user device 102 can communicate (e.g., via the communications device(s) 110) the speech utterance to the remote source(s) 104. The processor(s) 118*b* at the remote source(s) 104 can execute the instructions from the speech recognition module(s) 122. In other examples, the processor(s) 118*a* of the first user device 102 can executed the instructions from the speech recognition module(s) 122.

The speech recognition module(s) 122 can include instructions to recognize one or more words in a speech utterance provided by the user to the I/O system(s) 110. The speech recognition module(s) 122 can include instructions to generate one or more interpretations of the speech utterance using a recognition grammar. The recognition grammar can be or include a set of words or phrases which a user may speak. Such words or phrases can be adapted according to location, dialect associated with a location, etc. The words or phrases can be extracted from various input domains (e.g., domains for languages, navigation, music, movies, weather, various temporal or geographic proximities, or various other domains). The speech recognition module(s) 122 can generate one or more interpretations of the speech utterance, which may be represented as a series of phonemes or syllables. The interpretations can be analyzed to generate an interpretation as to what was uttered by the user. In this regard, the speech recognition module(s) 122 can include instructions to generate a "translation" of the speech utterance from the user, whereby the speech utterance is translated to a form that is "understandable" by a computer. In some instances, the computer-understandable representation can be a dictation of the speech utterance. In other instances, the computer-understandable representation can be a modified version of the speech utterance. For instance, the computer-understandable representation can be keywords included in the speech utterance.

Note that, where the user provides a textual input to the I/O system(s) 110, the textual input may already be a computer-understandable representation of the user's input. In this regard, the processor(s) 118*a*, 118*b* can identify a computer-understandable representation of a user's input. The processor(s) 118*a*, 118*b* can execute instructions from the speech recognition module(s) 122 to form a computer-understandable representation of a user's speech input. The processor(s) 118*a*, 118*b* can also identify a textual input provided to the I/O system(s) 110, the identified textual input being the computer-understandable representation of the user's textual input.

The memory 120*b* can store one or more natural language processing modules 128. The natural language processing module(s) 128 can include instructions that, when executed by the processor(s) 118*a*, 118*b*, cause the processor(s) 118*a*, 118*b* to process the computer-understandable representation of the user's input (e.g., textual, speech, or other form of input). The natural language processing module(s) 128 can include instructions to interpret the computer-understandable representation of the user's input. The natural language processing module(s) 128 can include instructions for using shared knowledge, contextual information, and various other sources of information to generate an intelligent hypothesis as to an actual meaning of the user input. By formulating the hypothesis using various features and components that model everyday human-to-human conversations, the processor(s) 118*a*, 118*b* can generate a hypothesis as to the meaning of the user input using instructions from the natural language processing module(s) 128. The meaning of the user input can inform a process of resolving one or more requests included in the user input. Further, the meaning of the user input can be used for other purposes, such as modifying the representation of the AI agent, as will be discussed in greater detail below.

The memory 120*b* can store one or more response generation modules 130. The response generation module(s) 130 can include instructions that, when executed by the processor(s) 118*a*, 118*b*, cause the processor(s) 118*a*, 118*b* to generate a response to a user's input. Based on the meaning of the user's input (as determined via the natural language processing module(s) 128), the processor(s) 118*a*, 118*b* can identify information to present to the user using instructions from the response generation module(s) 130. The information can be stored on memory 120*b*, at a remote storage location (e.g., in the cloud or on the internet), etc. The processor(s) 118*a*, 118*b* can generate a response to the user's input using the identified information. The response can be communicated to the first user device 102, which can then be presented to the user.

For purposes of clarity, the following example describes the analysis of one possible natural language utterance provided by the user to the I/O system(s) 110. A user may provide the following natural language utterance to the I/O system(s) 110 of the first user device 102: "What's the score of the Cardinals game?" The natural language utterance can be communicated, via the communications device(s) 108*a*, to the remote source(s) 104. The remote source(s) 104 can receive the natural language utterance.

The processor(s) 118*b* at the remote source(s) 104 can form a computer-understandable representation of the natural language utterance using instructions form the speech recognition module(s) 126. In some instances, the representation may be a dictation (e.g., what's-the-score-of-the-Cardinals-game). In other instances, the representation may be key words (e.g., score-Cardinals-game).

The processor(s) 118a, 118b can then interpret the representation using, for instance, shared knowledge, contextual information, etc. according to the instructions from the natural language processing module(s) 128. Continuing the example, the processor(s) 118a, 118b can determine "score" relates to a sporting event based on the context of the natural language utterance. The processor(s) 118a, 118b can determine that a word near "score" (e.g., "Cardinals") refers to an identifier (one team) of the sporting event. The processor(s) 118a, 118b can then identify the identifier "Cardinals" near the word "score". In this example, the user may be referring to the Arizona Cardinals (NFL), or the St. Louis Cardinals (MLB). Thus, an ambiguity exists. The processor(s) 118a, 118b can resolve the ambiguity from shared knowledge of each teams' schedule. For instance, the Arizona Cardinals may not play on the day the natural language utterance was provided, whereas the St. Louis Cardinals may play on the day the natural language utterance was provided. Thus, the processor(s) 118a, 118b can determine the user is referring to the St. Louis Cardinals based on the shared knowledge.

The processor(s) 118a, 118b can then generate a response (e.g., a response containing the score) to the user's natural language utterance using instructions from the response generation module(s) 130. The processor(s) 118a, 118b can access information corresponding to the St. Louis Cardinal's game. The information may be stored at a remote storage location (e.g., the cloud, the internet, etc.). The processor(s) 118a, 118b can generate a response (for example, "The current score of the St. Louis Cardinal's game is two to one in the bottom of the sixth inning") to the user's natural language utterance based on the information. The response can be communicated to the first user device 102. The first user device 102 can present the response to the user (e.g., on the display 116, audibly, and/or a combination thereof).

While the previous arrangements and example are described with reference to receiving, interpreting, and responding to a user input, a user input may be analyzed and responded to in many different ways. Accordingly, the present disclosure is not limited to a particular arrangement. To the contrary, the present disclosure includes other speech recognition and natural language processing systems that are now known or later developed. Note, while the previous components were described individually, the speech recognition module(s) 122, natural language processing module(s) 128, and response generation module(s) 130 will be collectively referred to hereinafter as the "AI agent".

The memory 120b can store one or more representation modification module(s) 132. The representation modification module(s) 132 can include instructions that, when executed by the processor(s) 118a, 118b, cause the processor(s) 118a, 118b to modify a representation of the AI agent that is presented to the user. The representation can be one or more visual attributes and/or geometric features used to represent the AI agent to the user. In one or more arrangements, the representation modification module(s) 132 can include instructions to present a first representation of the AI agent on a display (e.g., display 116) to the user. In some instances, the first representation may be a standard representation (e.g., a representation that is the same for all users of the disclosed system). For example, the first representation may be a single pixel. The representation modification module(s) 132 can include instructions to present the first representation to the user prior to the user providing any inputs to the AI agent. As will be discussed in further detail below, as the user provides inputs to the AI agent, the first representation can evolve based on the user inputs. As a result, the representation of the AI agent is personalized to the user. In some instances, the representation of the AI agent may be a two-dimensional representation. In other instances, the representation of the AI agent may be a three-dimensional representation.

The representation modification module(s) 132 can include instructions to use the meaning of the user input to determine a type of information included in the user input. In some instances, the representation modification module(s) 132 can include a database of types of information that may be included in a user input. The types of information can include, for instance, news, weather, science/technology, cooking, travel, sports, movies/TV/entertainment, restaurants, music, and/or other types of information that can be provided to the user from the AI agent. In some instances, the database can include sub-types. For instance, the type "sports" can include specific sports, sports teams, etc. As another example, the type "restaurants" and/or "cooking" can include specific types of cuisines. As another example, the type "travel" can include specific destinations, specific climates, specific regions, etc.

The representation modification module(s) 132 can include instructions to use the meaning of the user input for searching the database to identify the type of information included in the user input. Continuing the example provided above, using the natural language utterance, "What's the score of the Cardinals game?", the processor(s) 118a, 118b can determine "score" relates to a sporting event based on the context of the natural language utterance. Accordingly, the type of information included in the user input is "sports". To further determine a sub-type, the processor(s) 118a, 118b can determine that a word near "score" (e.g., "Cardinals") refers to an identifier (one team) of the sporting event (e.g., "The Cardinals"). As the processor(s) 118a, 118b have resolved the ambiguity using instructions from the natural language processing module(s) 128, the representation modification module(s) 132 can include instructions to use the resolved ambiguity to determine the type/sub-type of information (e.g., "The Arizona Cardinals", football, etc.).

In some examples, the user input may be soliciting information from the AI agent (such as the example provided above). In other examples, the user input may be the user providing information to the AI agent. For instance, the user may provide personal information (e.g., name, address, age, etc.) while setting up an account with the AI agent. In both of these examples, the representation modification module(s) 132 can include instructions to use information contained in the user input (e.g., either information provided by the user to the AI agent or information requested by the user from the AI agent) for modifying a visual representation of the AI agent, as will be discussed in further detail below.

Referring now to FIG. 1 and FIGS. 2A-5C, the representation modification module(s) 132 can include instructions to modify one or more features of the visual representation of the AI agent based on the type of information included in the user input. The representation modification module(s) 132 can include instructions to modify one or more features of the first representation of the AI agent to form a second representation when a first user input is received, modify the second representation of the AI agent to form a third representation when a second user input is received, and so on and so forth. In some implementations, the representation of the AI agent may be modified when the user provides an input having the same type of information a predetermined number of times (e.g., the user asks the AI agent the same type of question a predetermined number of times).

In one or more arrangements, the representation modification module(s) 132 can include instructions to modify one or more geometric features of the visual representation of the AI agent based on the type of information included in the user input. The geometric features can include a size of the visual representation and a shape of the AI agent. Additionally or alternatively, the representation modification module(s) 132 can include instructions to modify a color of the visual representation of the AI agent based on the type of information included in the user input. Each of the modifications to features of the visual representation of the AI agent will be discussed in turn below.

In one or more arrangements, the representation modification module(s) 132 can include instructions to modify a size of the visual representation of the AI agent. For instance, the representation modification module(s) 132 can include instructions to grow (e.g., enlarge a size of) the representation of the AI agent when new user inputs are received. In some arrangements, the representation modification module(s) 132 can include instructions to grow the representation of the AI agent every time the user provides additional inputs. The representation modification module(s) 132 can include instructions to grow the representation of the AI agent until the representation of the AI agent is fully grown (e.g., has reached a maximum size). The representation of the AI agent may be fully grown when the AI agent has reached a certain number of pixels, spans a predetermined space of a display, etc. In some instances, the representation of the AI agent can grow outwardly a certain number of pixels after each user input is received. The certain number of pixels may be one pixel, or more than one pixel.

In one or more arrangements, the representation modification module(s) 132 can include instructions to modify a shape of the visual representation of the AI agent. In some instances, the representation modification module(s) 132 can include instructions to modify a portion of the visual representation of the AI agent. For instance, the visual representation of the AI agent may include a core 200, an inner shell 202 surrounding the core 200, and an outer shell 204 surrounding the inner shell 202. The representation modification module(s) 132 can include instructions to modify a shape of the core 200, the inner shell 202, and/or the outer shell 204.

In one or more arrangements, the representation modification module(s) 132 can include instructions to modify a shape of the core 200. As shown in FIGS. 2A-3C, the core 200 has a cubic shape. Additionally, as shown in FIGS. 4A-5C, the core 200 has a spherical shape. While not shown, the core 200 can have a number of different shapes including, for instance, diamond, pyramid, prism, etc. The representation modification module(s) 132 can include instructions to select and/or modify the shape of the core 200 according to user inputs received via the input system(s). For instance, the representation modification module(s) 132 can include instructions to select and/or modify the shape of the core 200 based on the type of information included in the user inputs. As one example, the representation modification module(s) 132 can select particular shapes according to the type of information included in the user inputs. The shapes can each be associated with a respective type of information (for example, spherical for sports, cubic for weather, prism for news, etc.). The representation modification module(s) 132 can select a particular shape based on which type of information is included in the greatest number of user inputs.

In this example, the representation modification module(s) 132 can include instructions to maintain a ledger of a number of times a user input included a particular type of information. The representation modification module(s) 132 can include instructions to select and/or modify the shape of the core 200 according to the type of information that is included in the greatest number of user inputs.

Figure 2A:
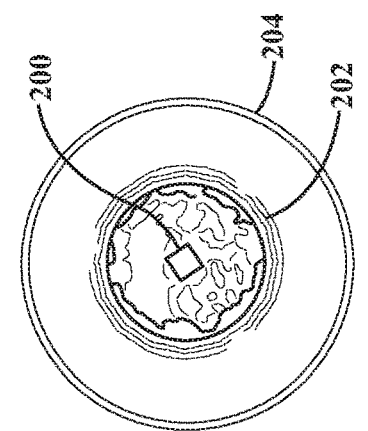
FIGS. 2A-2C are a series of modifications to a representation of the AI agent of FIG. 1 according to an example of a first set of user inputs.
Figure 2B:
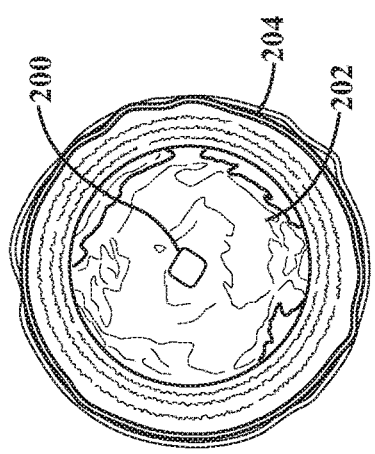
Figure 2C:
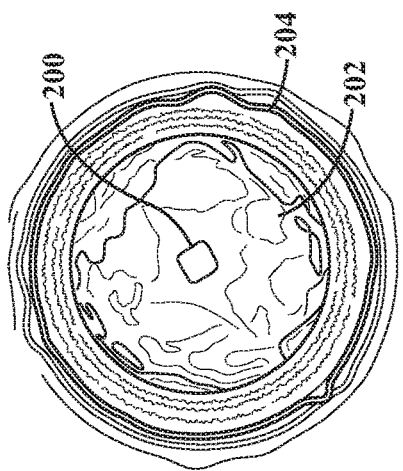
Figure 3A:
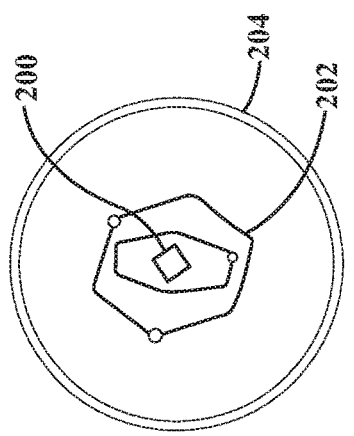
FIGS. 3A-3C are a series of modifications to a representation of the AI agent of FIG. 1 according to an example of a second set of user inputs.
Figure 3B:
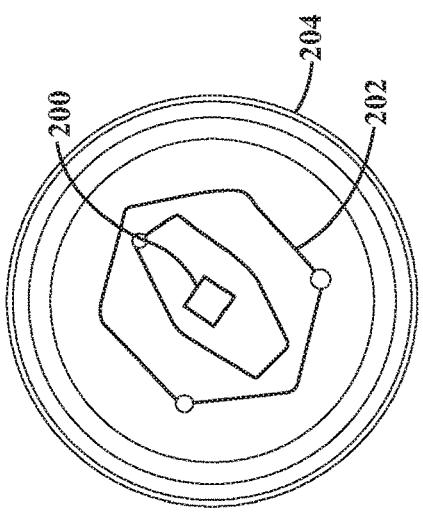
Figure 3C:
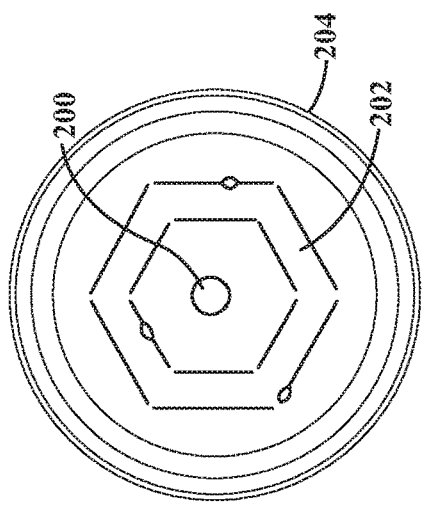
Figure 4A:
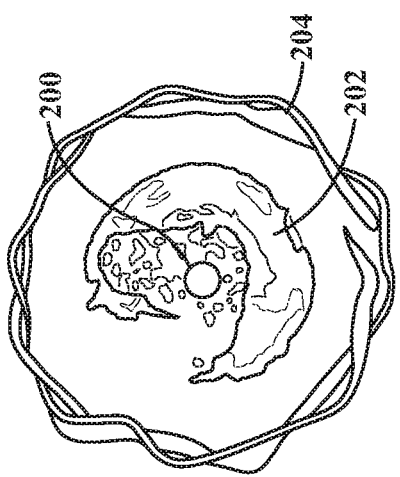
FIGS. 4A-4C are a series of modifications to a representation of the AI agent of FIG. 1 according to an example of a third set of user inputs.
Figure 4B:
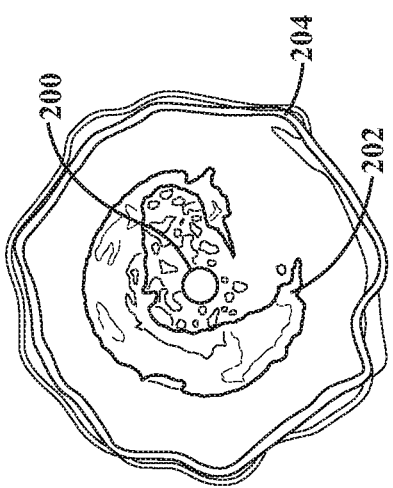
Figure 4C:
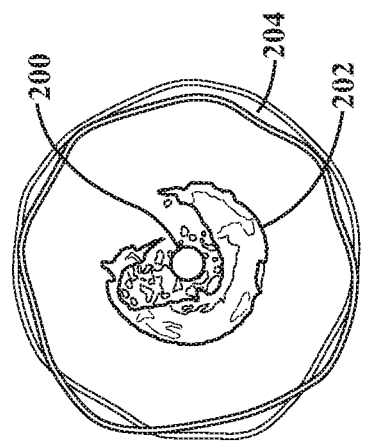
Figure 5A:
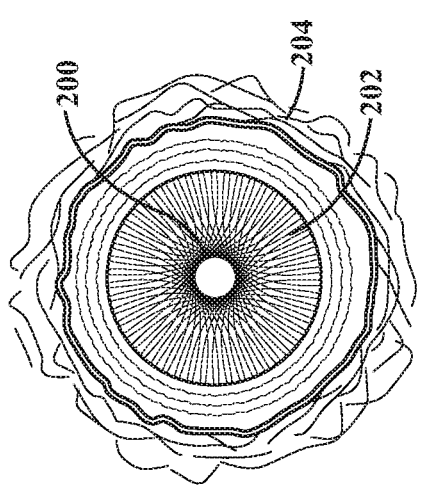
FIGS. 5A-5C are a series of modifications to a representation of the AI agent of FIG. 1 according to an example of a fourth set of user inputs.
Figure 5B:
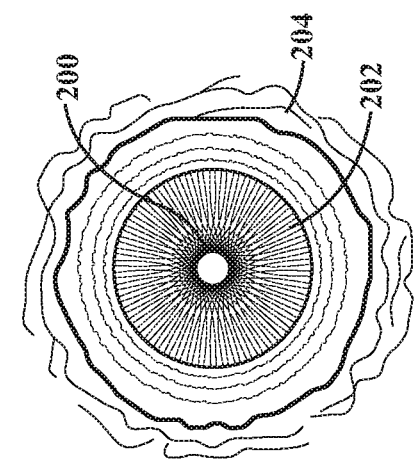
Figure 5C:
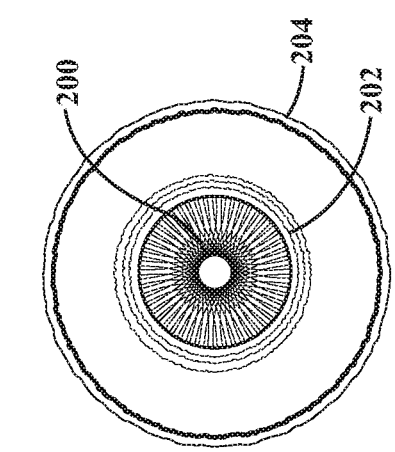

The representation modification module(s) 132 can include instructions to modify a shape of the inner shell 202. As shown in FIGS. 2A-2C and FIGS. 4A-5C, the inner shell 202 has a spherical shape. Additionally, as shown in FIG. 3A-3C, the inner shell 202 has a polygonic shape (e.g., a three dimensional shape constructed of one or more polygons). In one or more implementations, the representation modification module(s) 132 can include instructions to modify and/or select the shape of the inner shell 202 based on the type of information included in the user inputs. In some instances, the inner shell 202 may increase in complexity as additional user inputs are provided to the AI agent. For instance, the first representation (shown in, for example, FIG. 3A), may have an inner shell 202 that is not completely filled. As the user provides user inputs to the AI agent, the inner shell 202 may be further developed using instructions from the representation modification module(s) 132. Additionally, a structure of the inner shell 202 may be changed as additional user inputs are provided to the AI agent. The inner shell 202 may have interior and exterior facets. Each facet may have a shape that is changed according to user inputs provided to the AI agent. Similar to selecting and/or modifying the shape of the core 200, the shape of facets of the shell 202 can be selected or modified based on the type of information included in the user inputs. Additionally, the inner shell 202 may have a texture. For instance, the inner shell 202 may have a smoothed texture, a rough texture, a rippled texture, a filled texture, a porous texture, etc. The representation modification module(s) 132 can include instructions to select and/or modify a texture of the inner shell 202 (or facets thereof) based on the type of information included in the user inputs. As one example, the representation modification module(s) 132 can select particular shapes and/or textures for the inner shell 202 (or facets thereof) according to the type of information included in the user inputs. The shapes can each be associated with a respective type of information (for example, spherical for sports, smooth for music or entertainment, porous for news, polygonic for technology, etc.). Similar to the core 200, the representation modification module(s) 132 can select a particular shape for the inner shell 202 based on which type of information is included in the greatest number of user inputs. Additionally or alternatively, the representation modification module(s) 132 can include instructions to select particular shapes for facets, textures for the inner shell 202 or facets thereof, etc. as new user inputs are received. Further, the representation modification module(s) 132 can include instructions to increase the number of facets as additional inputs are received. In each of these arrangements, the representation modification module(s) 132 can include instructions for modifying geometric features of the inner shell 202 according to the type of information included in user inputs.

The representation modification module(s) 132 can include instructions to modify a shape or characteristic of the outer shell 204. As shown, the outer shell 204 may take the form of a waveform surrounding the inner shell 202. In some implementations, the waveform may be a longitudinal wave form (as shown in FIGS. 3A-3C). Additionally, the waveform may be a transverse wave form (as shown in FIGS. 4A-5C). Further, the outer shell 204 may take the form of a cloud (as shown in FIG. 2A-2C). In each of these implementations, the representation modification module(s) 132 can include instructions to select and/or modify the structure of the outer shell 204 according to user inputs. For instance, the representation modification module(s) 132 can include instructions to select and/or modify the shape or characteristic of the outer shell 204 based on the type of information included in the user inputs. As one example, the representation modification module(s) 132 can select particular shapes according to the type of information included in the user inputs. Similar to the core 200 and inner shell 202, the representation modification module(s) 132 can include instructions to select a particular shape or characteristic for the outer shell 204 based on which type of information is included in the greatest number of user inputs. The representation modification module(s) 132 can include instructions to modify the shape/characteristics for the outer shell 204 as additional user inputs are received. For instance, the representation modification module(s) 132 can include instructions to modify the depth or density of the cloud (as shown in the progression between FIG. 2A through FIG. 2C and FIG. 3A through FIG. 3C), a frequency of the waveform (as shown in the progression between FIG. 5A-FIG. 5C), and/or a skew of the waveform (as shown in the progression between FIG. 4A-FIG. 4C). In each of these examples, the representation modification module(s) 132 can include instructions to modify various features of the outer shell according to the user inputs received from the user.

In some implementations, the representation modification module(s) 132 can include instructions to select the shape of the core 200 according to the type of information included in the greatest number of user inputs, select the shape of the inner shell 202 according to the type of information included in the second greatest number of user inputs, and select the shape of the outer shell 204 according to the type of information included in the third greatest number of user inputs. Further, the representation modification module(s) 132 can include instructions to further modify various characteristics of the core 200, inner shell 202, and outer shell 204 as user inputs are received according to the type of information included in the respective user inputs. As additional user inputs are received, various characteristics of the core 200, inner shell 202, and outer shell 204 are modified and, thereby, the visual representation of the AI agent is changed according to the user inputs.

In one or more arrangements, the representation modification module(s) 132 can include instructions to modify a color of the core 200, inner shell 202, and/or outer shell 204 (or portions thereof). For instance, the representation modification module(s) 132 can include instructions to modify a color of various portions of the visual representation of the AI agent according to user inputs provided to the AI agent. As one example, if the user frequently solicits information from the AI agent regarding the Detroit Tigers and the Detroit Lions, the representation modification module(s) 132 can include instructions to modify a color of one or more portions of the visual representation of the AI agent to include navy and orange (e.g., colors associated with the Detroit Tigers), and Honolulu blue and silver (e.g., colors associated with the Detroit Lions). The representation modification module(s) 132 can modify a color of the core 200, inner shell 202, and/or outer shell 204 based on the type of information included in the user inputs.

As a result of execution of the instructions from the representation modification module(s) 132, over time, each user can have a visual representation of their AI agent which is personalized according to the types of information included in user inputs provided by the user to the AI agent.

In one or more arrangements, the memory 120b can store user identification data 134. The user identification data 134 can be or include data which separates one user of the disclosed system 100 and another user of the disclosed system 100. The user identification data 134 can include a pin, access ID, a URL, an IP address, or some other identifier which is associated with a user. Additionally, the user identification data 134 can be associated with a visual representation for the user corresponding to the user identification data 134. Further, the other device(s) 106 which the user owns or operates can be associated with the user identification data 134. In these examples, the AI agent can be accessible by the user on multiple devices and across multiple platforms. Additionally, the visual representation can be presented on the display (not shown) of the user's other device(s) 106. In this regard, the visual representation can be presented on multiple devices of the user, thus further enhancing the user's experience with the AI agent and enjoyment of the AI agent.

Figure 6:
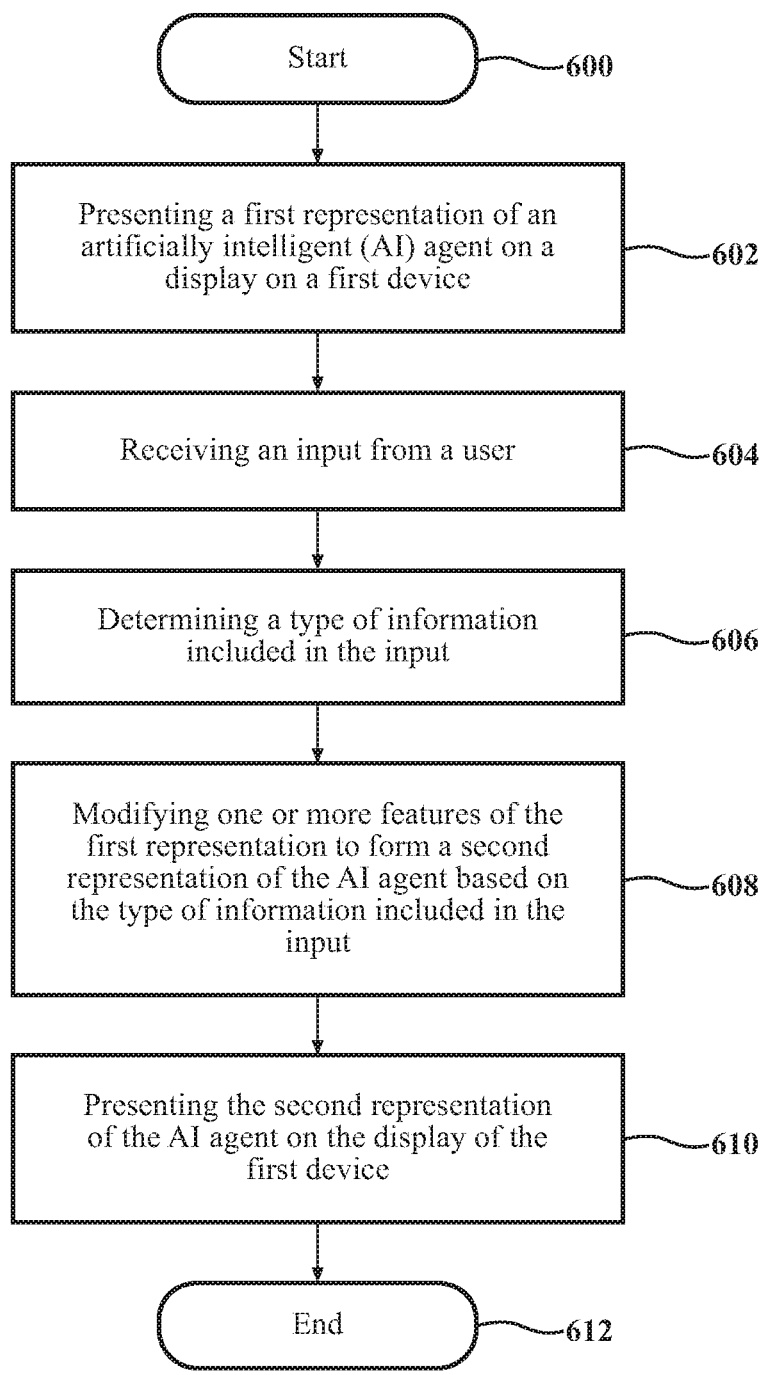
FIG. 6 is a flowchart showing an example method of displaying a personalized visual representation of the AI agent of FIG. 1.

Now that the various potential devices, elements and/or components of the system 100 have been described, various methods will now be described. Referring now to FIG. 6, an example of a method of displaying a personalized visual representation of an artificially intelligent agent is shown. Various possible steps of method will now be described. The method illustrated in FIG. 6 may be applicable to the arrangements described above in relation to FIGS. 1-5C, but it is understood that the method can be carried out with other suitable systems and arrangements. Moreover, the method may include other steps that are not shown here, and in fact, the method is not limited to including every step shown in FIG. 6. The steps that are illustrated here as part of the method are not limited to this particular chronological order. Indeed, some of the steps may be performed in a different order than what is shown and/or at least some of the steps shown can occur simultaneously.

The method can begin at starting block 600. The method can begin when the first user device 102 is activated. The method can begin when a user provides user identification information to the first user device 102. The method can continue to function block 602.

At function block 602, the processor(s) 118a, 118can control the display 116 of the I/O system(s) 110 to present a first representation of the AI agent. In some implementations, the first representation may be a standard representation used for all users. In these implementations, the first representation may be prior to any user inputs being provided to the AI agent. In other implementations, the first representation may be, at least, partially personalized to the user according to user inputs previously received. The method can continue to function block 604.

At function block 604, the input device(s) of the I/O system 110 can receive an input from the user. The input can be unrelated to the visual representation of the AI agent. For instance, the input may be related to sports, news, weather, technology, entertainment, etc. In this regard, the input may be an input for the AI agent to provide some information to the user. The method can continue to function block 606.

At function block 606, the processor(s) 118b at the remote source(s) 104 can determine a type of information included in the input. In one or more implementations, the communications device(s) 110 at the first user device 102 can transmit the input provided by the user to the remote source(s) 104. The processor(s) 118b at the remote source(s) 104 can receive the input. The processor(s) 118b at the remote source(s) 104 can process the input to determine a meaning of the user's input using instructions included in the natural language processing module(s) 128. The processor(s) 118b at the remote source(s) 104 can use the determined meaning of the user's intent to determine the type of information contained in the input provided by the user. The method can proceed to function block 608.

At function block 608, the processor(s) 118b at the remote source(s) 104 can modify one or more features of the first representation (of function block 602) to form a second representation of the AI agent based on the type of information determined at function block 606. The processor(s) 118b can form the second representation of the AI agent using the instructions from the representation modification module(s) 132. The processor(s) 118b can modify a size of the first representation, a shape of the first representation (or portions thereof, such as the core 200, inner shell 202, outer shell 204), a color of the first representation, etc. The method can proceed to function block 610.

At function block 610, the processor(s) 118a, 118b can control the display 116 of the I/O system(s) 110 to present a second representation of the AI agent to the user. As a result, the second representation may be personalized to the user according to input received at function block 604. The method can continue to ending block 612.

The method can end when the second representation is presented to the user following receiving the input from the user.

In some implementations, between function block 604 and 606, the method can further include generating a response to the input provided by the user at function block 604, and presenting the response to the user. In this regard, the processor(s) 118b at the remote source(s) 104 can both respond to inputs provided by the user, and use those inputs to personalize the representation of the AI agent presented to the user.

In some implementations, following function block 610, the method can further include instructions to communicate the second representation to the other device(s) 106 of the user. As a result, the personalized representation of the AI agent can be presented on all devices of the user. Thus, the user's experience with and entertainment by the AI agent may be enhanced.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A system for displaying a personalized visual representation of an artificially intelligent agent, the system comprising:
    an input device for receiving inputs from a user to interact with an artificially intelligent (AI) agent;
    a communications device for communicating information related to the inputs to a remote source, the remote source providing response information corresponding to the inputs received from the user;
    a display for presenting, at least, visual representations of the AI agent to the user;
    a processor operatively connected to the input device, the communications device, and the display;
    memory operatively connected to the processor, the memory storing executable instructions that, when executed by the processor, cause the processor to:
        present a first representation of the AI agent on the display;
        receive, over time, inputs unrelated to user settings of the first representation from the user, via the input device, to interact with the AI agent;
        determine types of information included in the inputs;
        modify, repeatedly, one or more visual geometric features of the first representation over time to form a modified representation of the AI agent which evolves at least geometrically based on the types of information included in the inputs by modifying one or more of a frequency of a waveform, a skew of a waveform or a density of a visual cloud representation of one or more of 1) a core, 2) an inner shell, and 3) an outer shell of the first representation; and
        present the modified representation of the AI agent on the display.

2. The system of claim 1, wherein the instructions to modify the one or more visual geometric features of the core, the inner shell, and the outer shell of the first representation are executed when one or more of the types of information included in the inputs are at least one of sports-related information, weather-related information, news-related information, technology-related information, and entertainment-related information.

3. The system of claim 1, wherein the input from the user comprises personal information provided by the user.

4. The system of claim 1, wherein the memory further stores instructions to:
    communicate the modified representation of the AI agent to a second device of the user, whereby the modified representation is presented on a display of the second device.

5. The system of claim 4, wherein the AI agent is accessible across multiple platforms.

6. The system of claim 1, wherein the instructions to modify the one or more visual geometric features of the first representation comprise instructions to:
    modify a size of the first representation to form the modified representation of the AI agent based on the types of information included in the inputs, the modified representation being larger than the first representation.

7. The system of claim 1, wherein the instructions to modify the one or more visual geometric features of the first representation comprise instructions to:
    modifying a shape of the first representation to form the modified representation of the AI agent based on the types of information included in the inputs, the modified representation being shaped differently from the first representation.

8. A system for displaying a personalized visual representation of an artificially intelligent agent, the system comprising:
    an input device for receiving inputs from a user to interact with an artificially intelligent (AI) agent;
    a communications device for communicating information related to the inputs to a remote source, the remote source providing response information corresponding to the inputs received from the user;
    a display for presenting, at least, visual representations of the AI agent to the user;
    a processor operatively connected to the input device, the communications device, and the display;
    memory operatively connected to the processor, the memory storing executable instructions that, when executed by the processor, cause the processor to:
        present a first representation of the AI agent on the display, wherein the first representation is a standard representation;
        receive an input unrelated to the first representation from the user via the input device;
        determine a type of information included in the input;
        modify one or more features of the first representation to form a second representation of the AI agent based on the type of information included in the input; and
        present the second representation of the AI agent on the display, wherein the first representation is a single pixel.

9. A method of displaying a personalized visual representation of an artificially intelligent agent, the method comprising:
    presenting a first representation of an artificially intelligent (AI) agent on a display on a first device;
    receiving, over time, inputs from a user that are unrelated to user settings of the first representation of the AI agent using one or more input devices for interacting with the AI agent;
    determining types of information included in the inputs;
    modifying, repeatedly, one or more visual geometric features of the first representation to form a modified representation of the AI agent that evolves at least geometrically based on the types of information included in the inputs by modifying one or more of a frequency of a waveform, a skew of a waveform or a density of a visual cloud representation of one or more of 1) a core, 2) an inner shell, and 3) an outer shell of the first representation; and
    presenting the modified representation of the AI agent on the display of the first device.

10. The method of claim 9, wherein modifying the one or more visual geometric features of the core, the inner shell, and the outer shell of the first representation is performed when one or more of the types of information included in the inputs are at least one of sports-related information, weather-related information, news-related information, technology-related information, and entertainment-related information.

11. The method of claim 9, wherein the input from the user comprises personal information provided by the user.

12. The method of claim 9, further comprising:
communicating the modified representation of the AI agent to a second device of the user, whereby the modified representation is presented on a display of the second device.

13. The method of claim 12, wherein the AI agent is accessible across multiple platforms.

14. The method of claim 9, wherein modifying the one or more features of the first representation comprises modifying a size of the first representation to form the modified representation of the AI agent based on the types of information included in the inputs, the modified representation being larger than the first representation.

15. The method of claim 9, wherein modifying the one or more features of the first representation comprises modifying a shape of the first representation to form the modified representation of the AI agent based on the types of information included in the inputs, the modified representation being shaped differently from the first representation.

16. A method of displaying a personalized visual representation of an artificially intelligent agent, the method comprising:
presenting a first representation of an artificially intelligent (AI) agent on a display on a first device, wherein the first representation is a standard representation;
receiving an input from a user that is unrelated to the first representation of the AI agent using one or more input devices for interacting with the AI agent;
determining a type of information included in the input;
modifying one or more features of the first representation to form a second representation of the AI agent based on the type of information included in the input; and
presenting the second representation of the AI agent on the display of the first device, wherein the first representation is a single pixel.

* * * * *